United States Patent
Mulder (10) Patent No.: US 9,541,208 B2
(45) Date of Patent: Jan. 10, 2017

(54) CRYOGENIC CHECK VALVE

(71) Applicant: Woodward, Inc., Fort Collins, CO (US)

(72) Inventor: Casey Michael Mulder, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 367 days.

(21) Appl. No.: 14/248,104

(22) Filed: Apr. 8, 2014

(65) Prior Publication Data

US 2015/0285389 A1 Oct. 8, 2015

(51) Int. Cl.
| | |
|---|---|
| *F16K 7/00* | (2006.01) |
| *F16K 17/00* | (2006.01) |
| *F16K 1/44* | (2006.01) |
| *F16K 15/04* | (2006.01) |
| *F16K 15/18* | (2006.01) |
| *F16K 31/02* | (2006.01) |

(52) U.S. Cl.
CPC ............ *F16K 17/003* (2013.01); *F16K 1/443* (2013.01); *F16K 15/044* (2013.01); *F16K 15/183* (2013.01); *F16K 31/025* (2013.01); *Y10T 137/0379* (2015.04); *Y10T 137/7737* (2015.04); *Y10T 137/7922* (2015.04); *Y10T 137/7927* (2015.04)

(58) Field of Classification Search
CPC ...... F16K 1/443; F16K 15/044; F16K 15/183; F16K 17/003; F16K 31/025; Y10T 137/0379; Y10T 137/7737; Y10T 137/7922; Y10T 137/7927
USPC ........................................ 236/101 R, 101 E
See application file for complete search history.

(56) References Cited

U.S. PATENT DOCUMENTS

| | | | |
|---|---|---|---|
| 4,355,827 A | 10/1982 | Ehret | |
| 4,523,605 A * | 6/1985 | Ohkata | E03B 7/12 116/218 |
| 4,667,694 A | 5/1987 | Dalton | |
| 8,141,790 B2 | 3/2012 | Sheppard | |
| 2005/0199845 A1 | 9/2005 | Jones et al. | |

(Continued)

FOREIGN PATENT DOCUMENTS

| | | |
|---|---|---|
| GB | 2311119 | 9/1997 |
| JP | S60201178 | 10/1985 |

(Continued)

OTHER PUBLICATIONS

PCT International Search Report and Written Opinion of the International Searching Authority, PCT/US2015/024865, Jul. 2, 2015, 10 pages.

*Primary Examiner* — Marc Norman
(74) *Attorney, Agent, or Firm* — Fish & Richardson P.C.

(57) ABSTRACT

The subject matter of this specification can be embodied in, among other things, a check valve that includes a valve body having a bore and a seat along the bore, a fluid inlet at a first end of the bore, and a fluid outlet a second end of the bore, a stopper selectively movable along the bore to contact the seat, the bore being occluded when the stopper is in contact with the seat, a first bias member on a first side of the stopper within the bore, the first bias member providing a first bias force upon the stopper in a first direction, and a second bias member on a second side of the stopper within the bore, the second side being opposite the first side, the second bias member providing a second bias force upon the stopper in a second direction opposite the first direction.

31 Claims, 4 Drawing Sheets

(56) References Cited

U.S. PATENT DOCUMENTS

2009/0032121 A1 2/2009 Chon

FOREIGN PATENT DOCUMENTS

| JP | S6338783 | | 2/1988 |
|----|----------|---|--------|
| JP | 06011070 A | * | 1/1994 |
| JP | H11125365 | | 5/1999 |

* cited by examiner

CRYOGENIC CHECK VALVE

TECHNICAL FIELD

This invention relates to fluid check valves.

BACKGROUND

Some vehicles, such as buses and natural gas transport trucks use liquid natural gas (LNG) as the form of fuel storage used on the vehicle. The LNG is vaporized and warmed before it travels to the fuel system on the engine. LNG tank systems include a heat exchanger to vaporize cryogenic LNG from the liquid to gaseous state. In the event of a loss of engine coolant supply or catastrophic failure of the heat exchanger, cryogenic fuel can flow to the fuel system and flow through many components that are not rated to endure cryogenic temperatures, leading to possible LNG leakage and fire risk.

Some current methods for preventing flow of liquid LNG rely on temperature sensors to detect changes in gas temperature or coolant temperature in the heat exchanger in order to detect LNG heat exchanger abnormalities. In the event that an abnormality is detected, a shut-off valve rated at a sufficiently low temperature is used to stop the flow of gas or LNG to the engine fuel system. Such cryogenic rated sensors and valves are typically expensive, and are sometimes unable to detect and react to all failure modes in time to prevent downstream issues. These types of methods are expensive and may not guarantee proper detection of an unsafe condition. There are very few, if any, cryogenic rated sensors or valves that are cost appropriate for the on-highway LNG market.

SUMMARY

In general, this document describes fluid check valves that control the flow of a fluid based on a temperature of the fluid.

In a first aspect, a check valve includes a valve body having a bore with a longitudinal axis and a seat along the bore, a fluid inlet at a first longitudinal end of the bore, and a fluid outlet a second longitudinal end of the bore, a stopper selectively movable along the bore to contact the seat, the bore being occluded when the stopper is in contact with the seat, a first bias member on a first longitudinal side of the stopper within the bore, the first bias member providing a first bias force upon the stopper in a first longitudinal direction, and a second bias member on a second longitudinal side of the stopper within the bore, the second longitudinal side being opposite the first longitudinal side, the second bias member providing a second bias force upon the stopper in a second longitudinal direction opposite the first longitudinal direction.

Various implementations may include some, all, or none of the following features. The first bias member can be a thermally sensitive shape memory material and the first bias force can be a thermally variable bias force, the thermally variable bias force being less than the second bias force at temperatures below a threshold temperature and equal to or greater than the second bias force at temperatures at or above the threshold temperature. The second bias member can be a thermally sensitive shape memory material and the second bias force can be a thermally variable bias force, the thermally variable bias force being less than the first bias force at temperatures below a threshold temperature and equal to or greater than the first bias force at temperatures at or above the threshold temperature. At least one of the first bias member or the second bias member can be formed of a nickel-titanium shape memory alloy. At least one of the first bias member or the second bias member can be formed of a steel alloy. The first direction can be in a direction toward the seat. The first direction can be in a direction away from the seat. The stopper can be a sphere. The bias member can be a spring. The check valve can be part of a mobile fluid transport platform that comprises a mobile fluid storage vessel, wherein the fluid inlet can be configured to receive a fluid from the mobile fluid storage vessel.

In a second aspect, a method for controlling fluid flow in one direction includes providing a check valve having a valve body having a bore having a longitudinal axis and a seat along the bore, a fluid inlet at a first longitudinal end of the bore, and a fluid outlet a second longitudinal end of the bore, a stopper selectively movable along the bore to contact the seat, the bore being occluded when the stopper is in contact with the seat, a first bias member on a first longitudinal side of the stopper within the bore, the first bias member providing a first bias force upon the stopper in a first longitudinal direction, and a second bias member on a second longitudinal side of the stopper within the bore, the second longitudinal side being opposite the first longitudinal side, the second bias member providing a second bias force upon the stopper in a second longitudinal direction opposite the first longitudinal direction, providing a fluid to the fluid inlet at a first temperature, flowing the fluid past the first bias member, the stopper, and the second bias member to the fluid outlet, providing the fluid to the fluid inlet at a second temperature, contacting, based on the second temperature, the stopper to the seat, and resisting, by the stopper and the seat, flow of the fluid to the fluid outlet.

Various implementations may include some, all, or none of the following features. The first bias member can be a thermally sensitive shape memory material and the first bias force can be a thermally variable bias force, the thermally variable bias force being less than the second bias force at temperatures below a threshold temperature and equal to or greater than the second bias force at temperatures at or above the threshold temperature. The second bias member can be a thermally sensitive shape memory material and the second bias force can be a thermally variable bias force, the thermally variable bias force being less than the first bias force at temperatures below a threshold temperature and equal to or greater than the first bias force at temperatures at or above the threshold temperature. At least one of the first bias member or the second bias member can be formed of a nickel-titanium shape memory alloy. At least one of the first bias member or the second bias member can be formed of a steel alloy. The first direction can be in a direction toward the seat. The first direction can be in a direction away from the seat. The stopper can be a sphere. The bias member can be a spring. The check valve can be part of a mobile fluid transport platform that comprises a mobile fluid storage vessel, wherein the fluid inlet can be configured to receive a fluid from the mobile fluid storage vessel.

In a third aspect, a system for conditionally flowing a fluid based a temperature of the fluid includes a valve body having a bore having a longitudinal axis and a seat along the bore, a fluid inlet at a first longitudinal end of the bore, and a fluid outlet a second longitudinal end of the bore, a stopper selectively movable along the bore to contact the seat, the bore being occluded when the stopper is in contact with the seat, a first bias member on a first longitudinal side of the stopper within the bore, the first bias member providing a first bias force upon the stopper in a first longitudinal direction, and a second bias member on a second longitudinal side of the stopper within the bore, the second longitudinal side being opposite the first longitudinal side, the second bias member providing a second bias force upon the stopper in a second longitudinal direction opposite the first longitudinal direction.

Various implementations may include some, all, or none of the following features. The first bias member can be a thermally sensitive shape memory material and the first bias force can be a thermally variable bias force, the thermally variable bias force being less than the second bias force at temperatures below a threshold temperature and equal to or greater than the second bias force at temperatures at or above the threshold temperature. The second bias member can be a thermally sensitive shape memory material and the second bias force can be a thermally variable bias force, the thermally variable bias force being less than the first bias force at temperatures below a threshold temperature and equal to or greater than the first bias force at temperatures at or above the threshold temperature. At least one of the first bias member or the second bias member can be formed of a nickel-titanium shape memory alloy. At least one of the first bias member or the second bias member can be formed of a steel alloy. The first direction can be in a direction toward the seat. The first direction can be in a direction away from the seat. The stopper can be a sphere. The bias member can be a spring. The check valve can be part of a mobile fluid transport platform that comprises a mobile fluid storage vessel, wherein the fluid inlet can be configured to receive a fluid from the mobile fluid storage vessel.

The systems and techniques described here may provide one or more of the following advantages. First, a system can provide a fluid flow safety mechanism that relies on mechanical physics to operate. Second, the system can be lower cost than other systems that implement temperature sensors, solenoid shut off valves, and control electronics to perform a similar task. Third, the system can be adapted to any commercially available LNG tank system without requiring additional electronics, power, or complex additional plumbing in order to operate.

The details of one or more implementations are set forth in the accompanying drawings and the description below. Other features and advantages will be apparent from the description and drawings, and from the claims.

DETAILED DESCRIPTION

This document describes systems and techniques for controlling the flow of cryogenic fluids, such as liquid natural gas (LNG), based on a predetermined temperature. In general, a spring-loaded check valve is placed in the fluid flow path. At least one spring or other bias member is made of a temperature sensitive shape memory alloy, which keeps the valve open when the fluid is above a predetermined temperature, and closed when the fluid drops below a predetermined temperature. For example, the valve can allow LNG to flow at gaseous temperatures, but prevent the flow of LNG at liquid temperatures.

Figure 1:
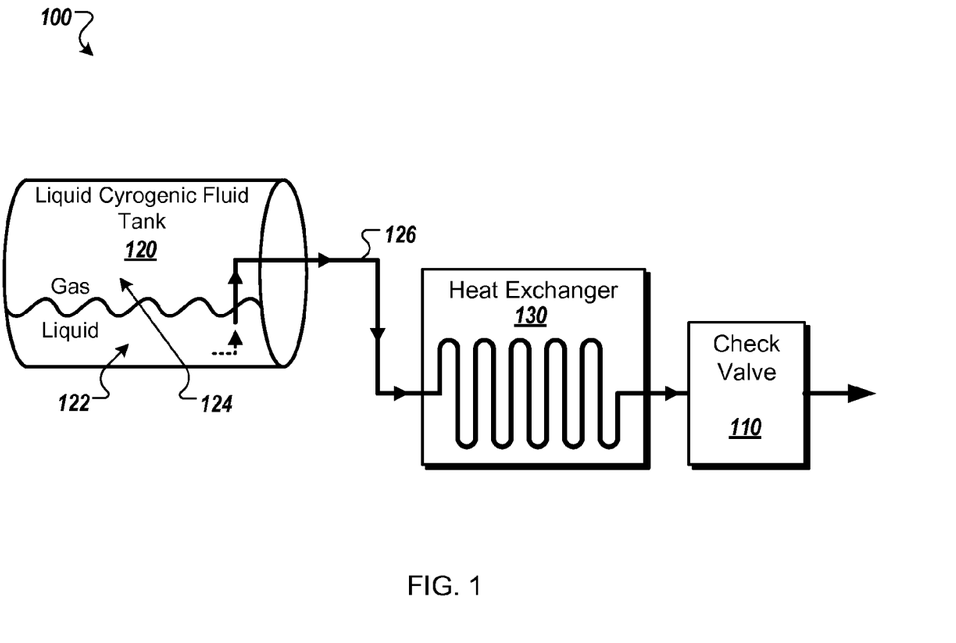
FIG. 1 is a schematic diagram that shows an example of a cryogenic fluid delivery system with a cryogenic fluid valve.

FIG. 1 is a schematic diagram that shows an example of a cryogenic fluid delivery system 100 with a cryogenic fluid valve 110. The system 100 includes a liquid cryogenic fluid tank 120. The tank 120 holds a pressurized cryogenic fluid that exists partly as a cryogenic liquid 122 and partly as a cryogenic gas 124. In some embodiments, the cryogenic fluid can be natural gas that is held under sufficient pressure to maintain the natural gas partly as liquid natural gas (LNG) and partly in a gaseous state. In the example of LNG, the cryogenic liquid 122 can be at a temperature of about −130° C., and the cryogenic gas 124 can be at a pressure of about 7 bar. In some implementations, the tank 120 can be a vessel mounted on a vehicle or other mobile platform for the mobile storage, transport, delivery, and/or use of the cryogenic fluid, such as a LNG delivery truck or a LNG fueled vehicle.

Pressure provided by the cryogenic gas 124 causes the cryogenic fluid 122 to flow out of the tank 120 through an outlet pipe 126 to a heat exchanger 130. The heat exchanger 130 warms the cryogenic fluid 122 by allowing the fluid 122 to absorb heat from external sources, such as ambient air, heating elements, on-vehicular applications, or heated engine coolant. In some embodiments, the heat exchanger 130 can warm the cryogenic fluid 122 sufficiently to cause the fluid 122 to change from a liquid state to a gaseous state. For example, LNG can enter the heat exchanger 130 at a temperature of about −130° C. or less and a pressure of about 7 bar, and exit at a temperature of about +20° C. and a pressure of about 7 bar.

As it flows through the heat exchanger, the cryogenic fluid 122 is warmed to a gaseous state. The gas flows, through the cryogenic fluid valve 110 and out to a point of use, such as to fuel an engine or to fill a destination storage tank. The valve 110 is a check valve (e.g., a ball check valve, a poppet valve) with a thermally-reactive mechanism that permits flow when the cryogenic fluid 122 is at or above a predetermined temperature (e.g., warmed to a gaseous state) and resists flow when the cryogenic fluid 122 is below the predetermined temperature. The valve 110 is discussed in additional detail in the descriptions of FIGS. 2 and 3.

In some embodiments, the predetermined temperature may be based on the temperature ratings of plumbing, valves, and other fluid flow components downstream of the cryogenic fluid valve 110 to prevent such components from being exposed to temperatures below their rated limits, such as in the event that the heat exchanger 130 is unable to sufficiently warm the cryogenic fluid 122. For example, an internal combustion engine can use gaseous natural gas as fuel, however many such engine and fuel delivery components may not be rated for the colder temperatures associated with LNG (e.g., temperatures below about −40° C.) and can cause failures such as shrinkage and leakage of seal components, cracks and leakage in plastic or rubber components, and other temperature-related problems. In another example, an internal combustion engine can use LNG as fuel, and while gaseous natural gas can be used to fuel the engine, if liquefied natural gas is allowed to enter a combustion chamber severe engine damage can be caused when a piston attempts to compress the LNG in its incompressible liquid state. In such examples, the valve 110 can prevent such engine damage by halting the flow of LNG before it reaches the engine. In another example, pipes, valves, and other plumbing components may seize, leak, become brittle, break, rupture, or otherwise malfunction when exposed to temperatures below their rated limits. In examples of LNG applications, such malfunctions can present risks for fire, explosion, or can expose persons nearby to respiratory or thermal hazards. In such examples, the valve 110 can safeguard against such hazards by halting the flow of LNG before it reaches components that are not rated for use at cryogenic temperatures.

Figure 2A:
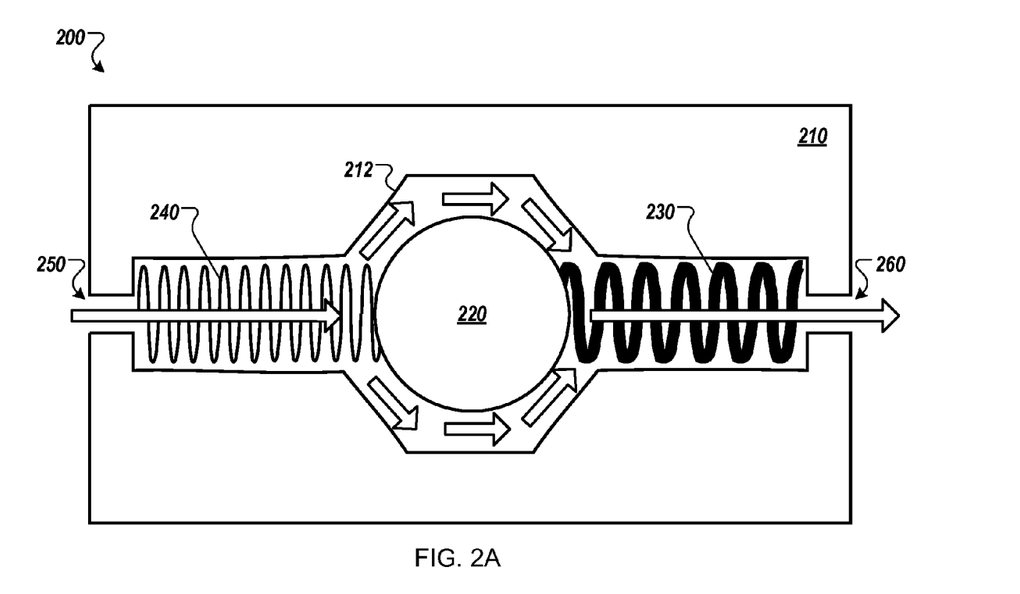
FIG. 2A is a cross-sectional diagram that shows an example of a cryogenic fluid valve in a flowing state.

FIG. 2A is a cross-sectional diagram that shows an example of a cryogenic fluid valve 200 in a flowing state. In some embodiments, the valve 200 can be an example of the cryogenic fluid valve 110 of FIG. 1. The valve 200 includes a valve body 210 with a bore 212, a stopper 220 within the bore 212, a biasing member 230 on a first side of the stopper 220 within the bore 212, and a biasing member 240 on an opposite side of the stopper 220 within the bore 212. A fluid inlet 250 and a fluid outlet 260 are in fluid communication with the bore 212. In some embodiments, the biasing member 220 and/or 230 can be springs. In some embodiments, the biasing member 220 and/or 230 can have forms other than springs. Additional examples of bias members are discussed in the description of FIGS. 4A-4D.

In the illustrated example, the stopper 220 is a sphere that is large enough to occlude the outlet 260 but not pass through it. As a fluid flows from an inlet to the outlet 260, the pressure of the fluid urges the stopper 220 along the bore toward a seated position against the outlet 260. The biasing members 230 and 240 provide selectably alterable biasing forces against the stopper 220 to selectably prevent or allow the stopper 220 from sealing the outlet 260. The alterable quality of the aforementioned biasing forces is provided by the construction of the biasing members 230 and 240. One or both of the biasing members 230, 240 is made of a thermally-reactive material such that the biasing force of one or both of the biasing members 230, 240 is at least temperature-dependent. In some embodiments, one or both of the biasing members 230, 240 can be at least partly constructed of a shape-memory alloy such as nickel-titanium (e.g., nitinol) to exhibit a first biasing force at or above a predetermined temperature (e.g., −50° C.) and a second biasing force different from the first when below the predetermined temperature. In some embodiments, one or more of the biasing members 230, 240 is made of a material such a steel that is substantially unaffected by temperature.

In the illustrated example, the biasing members 230 and 240 are at or above a predetermined temperature. For example, under normal operating conditions LNG can leave a heat exchanger at temperatures of about −30° C. to about +40° C. The fluid flows from an inlet 250, across the biasing member 240, around the stopper 220, across the biasing member 230, and out an inlet 260. The fluid heats or cools the biasing members 230, 240. Based at least partly on the temperature of the fluid, the biasing members 230, 240 provide biasing forces that urge the stopper 220 away from the fluid outlet 260, preventing the stopper 220 from occluding the fluid outlet 260 and allowing the flow to continue. For example, the fluid temperature can cause the biasing force of the biasing member 230 to become relatively less than its biasing force at colder temperatures, and/or the fluid temperature can cause the biasing force of the biasing member 240 to become relatively greater than its biasing force at colder temperatures.

Figure 2B:
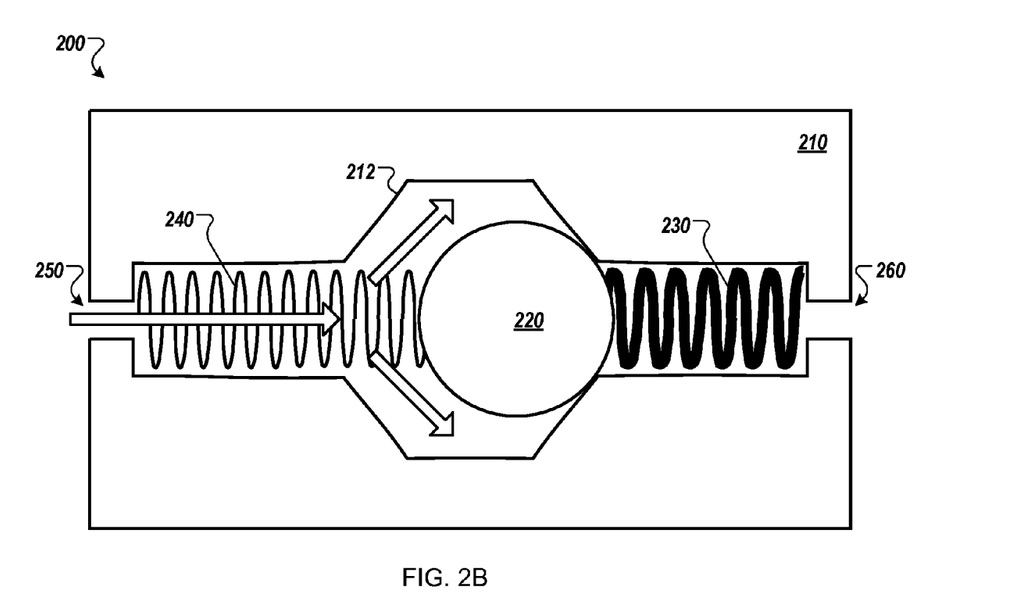
FIG. 2B is a cross-sectional diagram that shows an example of a cryogenic fluid valve in a stopped state.

FIG. 2B is a cross-sectional diagram that shows the example cryogenic fluid valve 200 in a stopped state. In the illustrated example, the biasing members 230 and 240 are below a predetermined temperature. For example, if a heat exchanger fails, LNG in liquid state at temperatures well below −100° C. could flow to the valve 200.

The fluid flows from an inlet 250, across the biasing member 240, to the bore 212. The fluid heats or cools the biasing members 230, 240. Based at least partly on the temperature of the fluid, the biasing members 230, 240 provide biasing forces that allow the pressure of the fluid to urge the stopper 220 to become seated against the fluid outlet 260, occluding the fluid outlet 260 and preventing further fluid flow. As the temperatures of the biasing members 230, 240 rise to the predetermined temperature once again, the bias forces of the biasing members 230, 240 change to urge the stopper 220 away from its seated position and allow fluid flow to resume once again. For example, the fluid temperature can cause the biasing force of the biasing member 230 to become relatively greater than its biasing force at warmer temperatures (e.g., such as those causing the valve 200 to exhibit the configuration shown in FIG. 2A), and/or the fluid temperature can cause the biasing force of the biasing member 240 to become relatively less than its biasing force at warmer temperatures.

In some embodiments, one of the biasing members 230, 240 can be thermally reactive (e.g., Ni—Ti alloy), and the other can be substantially non-thermally reactive (e.g., steel). In some embodiments, both of the biasing members 230, 240 can be thermally reactive. In some embodiments, the biasing members 230, 240 can be configured to prevent fluid flows at temperatures below a predetermined threshold temperature. In some embodiments, the biasing members 230, 240 can be configured to prevent fluid flows at temperatures above a predetermined threshold temperature.

In some embodiments, the biasing member 230 can be omitted. For example, the biasing member 240 can provide a temperature-dependent bias against the stopper 220 to keep the fluid outlet 260 open at temperatures above a predetermined threshold, and allow fluid pressure to urge the stopper 220 into sealing contact with the outlet 260 at temperatures below the threshold. Alternatively, in some embodiments, the biasing member 240 can be configured to allow fluid pressure to cause the stopper to occlude the outlet 260 at temperatures at or above a predetermined threshold temperature and provide a bias force that keeps the outlet 260 open at temperatures below the threshold.

Figure 3:
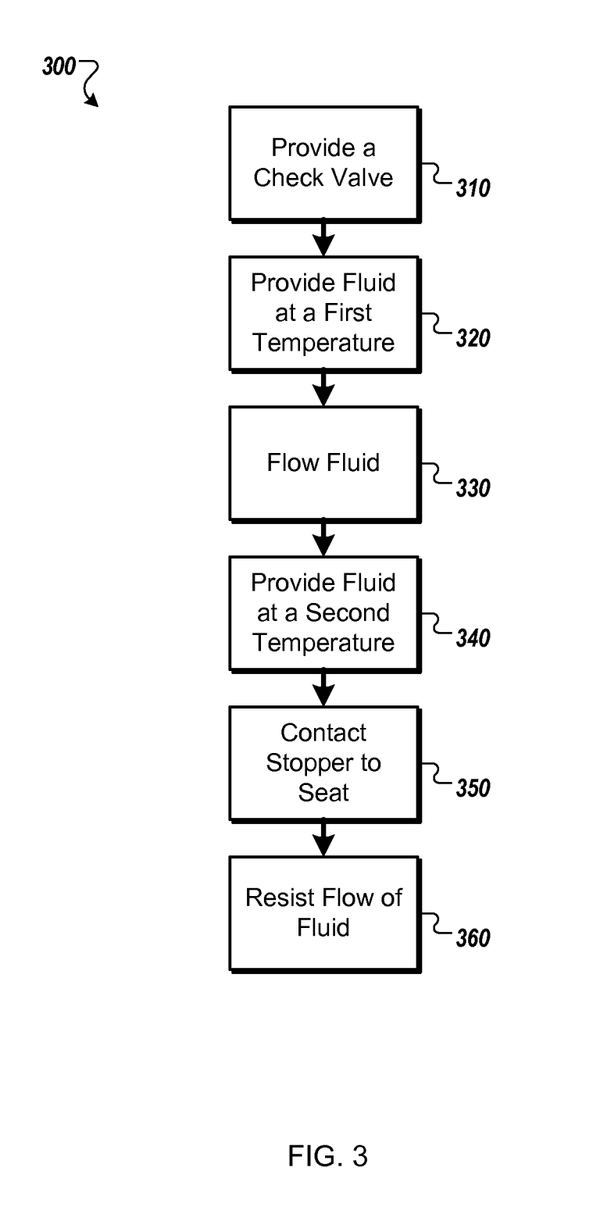
FIG. 3 is flow chart that shows an example of a process for operation of a cryogenic fluid valve.

FIG. 3 is flow chart that shows an example of a process 300 for operation of a cryogenic fluid valve, such as the example cryogenic fluid valve 110 of FIG. 1 or the cryogenic fluid valve 200 of FIGS. 2A and 2B. At 310, a check valve is provided. For example, the cryogenic fluid valve 200 is a check valve with a thermally reactive mechanism that can selectably allow or prevent the flow of a fluid based on the temperature of the fluid.

At 320, a fluid is provided to a fluid inlet at a first temperature. For example, LNG can be provided at the fluid inlet 250 at a temperature of about +50° C. or greater. At 330, the fluid is flowed past a first spring, a stopper, and a second spring to a fluid outlet. For example, LNG can flow across the biasing member 230, past the stopper 220, and across the biasing member 240 to the fluid outlet 260.

At 340, fluid is provided to a fluid inlet at a second temperature. For example, LNG can be provided at the fluid inlet 250 at a temperature less than about +50° C. At 350, the stopper is contacted to the seat based on the second temperature. For example, gaseous natural gas or LNG in liquid form can cool the biasing member 230 and/or the biasing member 240 and cause the biasing force provided by one or both of the biasing members 230, 240 to change, allowing the stopper to contact the outlet 260. At 360, the flow of fluid is resisted. For example, with the stopper 220 in contact with the outlet 260, the outlet 260 becomes occluded and substantially blocks further fluid flow.

Although several of the described examples discussed the use of LNG with the example cryogenic fluid valve 110 of FIG. 1 or the cryogenic fluid valve 200 of FIGS. 2A and 2B, other applications exist. For example, the cryogenic fluid valve 110 or the cryogenic fluid valve 200 can be used to control the flows of hydrogen, helium, oxygen, carbon dioxide, ammonia, nitrogen, or any other appropriate fluid in gaseous or liquid form. In some embodiments, the cryogenic fluid valve 110 or the cryogenic fluid valve 200 may be configured to control the flows of non-cryogenic fluids. For example, the cryogenic fluid valve 110 or the cryogenic fluid valve 200 may be configured to pass a flow of water steam but block the flow of liquid water. Although in several of the described examples the cryogenic fluid valve 110 or the cryogenic fluid valve 200 are described as blocking the flow of fluids below a predetermined temperature and allow the flow of fluids above the predetermined temperature, other embodiments exist. In some embodiments the cryogenic fluid valve 110 or the cryogenic fluid valve 200 can be configured to pass fluids below a predetermined temperature and block fluids at or above the predetermined temperature. For example, the cryogenic fluid valve 110 or the cryogenic fluid valve 200 can be configured as a high-temperature safety shutoff valve, in which LNG or other fluids can be allowed to flow until the temperature of the fluid to the valve itself rises above a predetermined safety threshold (e.g., to cut off fuel flow in the event of a fire or overheat condition).

FIGS. 4A-4D are front and side views of another bias member 400 that can be used with the cryogenic fluid valve 200 of FIGS. 2A and 2B. For example, the bias member 400 can replace the bias member 230 or 240. The bias member 400 includes a body 402 with a bore 404, and a collection of lever arms 406 extending partly into the bore 404. The bore 404 is configured with a diameter less than that of the stopper 220, and as such the stopper 220 can substantially occlude the bore 404. The lever arms 406 are formed of a shape memory alloy configured to vary the angle at which the lever arms 406 extend into the bore 404 based on the temperature of a fluid, such as LNG, flowing through the bore 404.

Figure 4A:
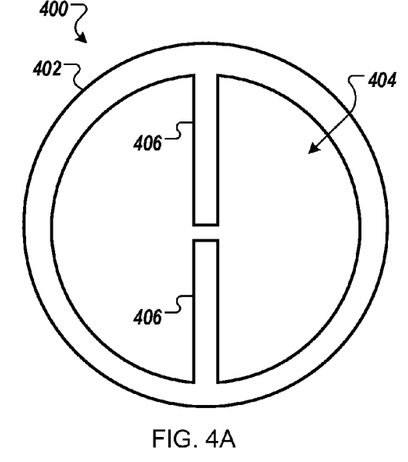
FIGS. 4A-4D are front and side views of another bias member that can be used with the cryogenic fluid valve of FIGS. 2A and 2B.
Figure 4B:
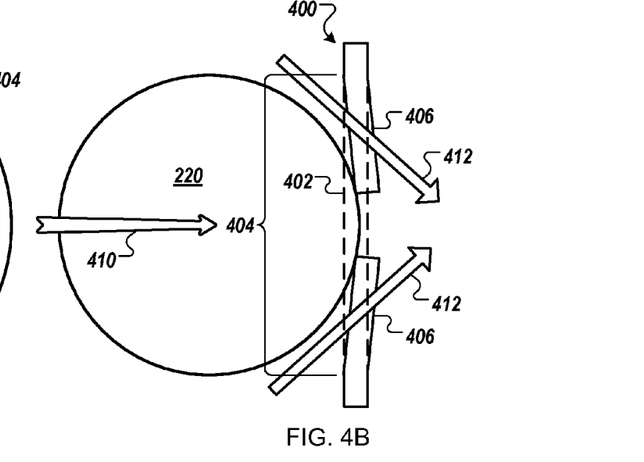

Referring to FIGS. 4A and 4B, the bias member 400 is shown in a flowing state, such as temperatures at which gaseous natural gas can flow. At flowing state temperatures, the shape memory configuration of the lever arms 406 causes the lever arms to extend into the bore substantially in plane with the body. In such a configuration, a fluid flow represented by an arrow 410 urges the stopper 220 toward the bias member 400. The lever arms 406 resist the movement of the stopper 220 along the flow path, preventing the stopper 220 from becoming seated against the body 402 and occluding the bore 404. With the stopper 220 held away from the bore 404, a flow of fluid represented by the arrows 412 can pass through the bore 404.

Figure 4C:
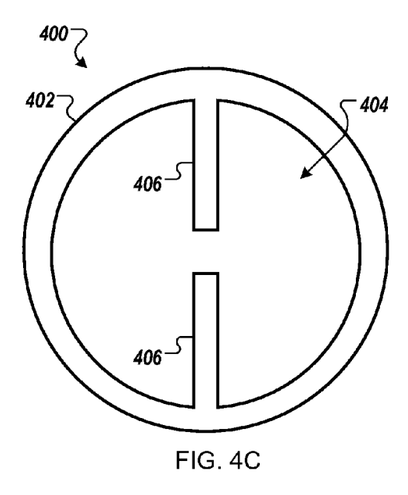
Figure 4D:
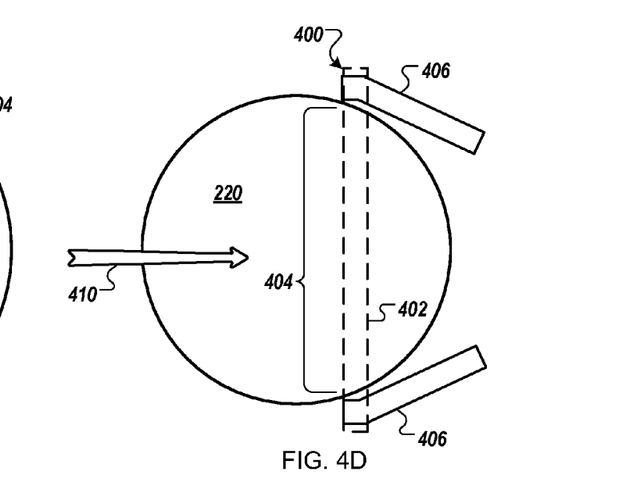

Referring to FIGS. 4C and 4D, the bias member 400 is shown in a stopped state, such as temperatures associated with a flow of LNG. At stopped state temperatures, the shape memory configuration of the lever arms 406 causes the lever arms to extend out of the plane with the body 402 along the flow path. In such a configuration, the fluid flow 410 urges the stopper 220 toward the bias member 400 to become seated against the body 402 and substantially occlude the bore 404. With the stopper 220 occluding the bore 404, the flow of fluid is substantially prevented from passing through the bore 404.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A check valve comprising:
    a valve body having a bore having a longitudinal axis and a seat along the bore, a fluid inlet at a first longitudinal end of the bore, and a fluid outlet a second longitudinal end of the bore;
    a stopper selectively movable along the bore to contact the seat, the bore being occluded when the stopper is in contact with the seat;
    a first bias member on a first longitudinal side of the stopper within the bore, the first bias member providing a first bias force upon the stopper in a first longitudinal direction; and
    a second bias member on a second longitudinal side of the stopper within the bore, the second longitudinal side being opposite the first longitudinal side, the second bias member providing a thermally variable second bias force upon the stopper in a second longitudinal direction opposite the first longitudinal direction, the second bias member comprising a thermally sensitive shape memory material, the thermally variable bias force being less than the first bias force at temperatures below about $-50°$ C. and equal to or greater than the first bias force at temperatures at or above about $-50°$ C.

2. The check valve of claim 1, wherein the first bias member comprises a thermally sensitive shape memory material and the first bias force is a thermally variable bias force, the thermally variable bias force being less than the thermally variable second bias force at temperatures below a threshold temperature of about $-50°$ C. and equal to or greater than the thermally variable second bias force at temperatures at or above the threshold temperature.

3. The check valve of claim 1, wherein the second bias member comprises a thermally sensitive shape memory material and the thermally variable second bias force being less than the first bias force at temperatures below a threshold temperature of about $-50°$ C. and equal to or greater than the first bias force at temperatures at or above the threshold temperature.

4. The check valve of claim 1, wherein at least one of the first bias member or the second bias member comprise a nickel-titanium shape memory alloy.

5. The check valve of claim 1, wherein at least one of the first bias member or the second bias member comprises a steel alloy.

6. The check valve of claim 1, wherein the first direction is in a direction toward the seat.

7. The check valve of claim 1, wherein the first direction is in a direction away from the seat.

8. The check valve of claim 1, wherein the stopper is a sphere.

9. The check valve of claim 1, wherein at least one of the first bias member and the second bias member is a spring.

10. The check valve of claim 1, wherein the check valve is part of a mobile fluid transport platform that comprises a mobile fluid storage vessel, wherein the fluid inlet is configured to receive a fluid from the mobile fluid storage vessel.

11. A method for controlling fluid flow in one direction, comprising:
   providing a check valve comprising:
      a valve body having a bore having a longitudinal axis and a seat along the bore, a fluid inlet at a first longitudinal end of the bore, and a fluid outlet a second longitudinal end of the bore;
      a stopper selectively movable along the bore to contact the seat, the bore being occluded when the stopper is in contact with the seat;
      a first bias member on a first longitudinal side of the stopper within the bore, the first bias member providing a first bias force upon the stopper in a first longitudinal direction; and
      a second bias member on a second longitudinal side of the stopper within the bore, the second longitudinal side being opposite the first longitudinal side, the second bias member providing a thermally variable second bias force upon the stopper in a second longitudinal direction opposite the first longitudinal direction, the second bias member comprising a thermally sensitive shape memory material, the thermally variable bias force being less than the first bias force at temperatures below about −50° C. and equal to or greater than the first bias force at temperatures at or above about −50° C.;
   providing a fluid to the fluid inlet at a first temperature at or above about −50° C.;
   flowing the fluid past the first bias member, the stopper, and the second bias member to the fluid outlet;
   providing the fluid to the fluid inlet at a second temperature below about −50° C.;
   contacting, based on the second temperature, the stopper to the seat; and
   resisting, by the stopper and the seat, flow of the fluid to the fluid outlet.

12. The method of claim 11, wherein the first bias member comprises a thermally sensitive shape memory material and the first bias force is a thermally variable bias force, the thermally variable bias force being less than the thermally variable second bias force at temperatures below a threshold temperature of about −50° C. and equal to or greater than the thermally variable second bias force at temperatures at or above the threshold temperature.

13. The method of claim 11, wherein the second bias member comprises a thermally sensitive shape memory material and the thermally variable second bias force being less than the first bias force at temperatures below a threshold temperature of about −50° C. and equal to or greater than the first bias force at temperatures at or above the threshold temperature.

14. The method of claim 11, wherein at least one of the first bias member or the second bias member comprise a nickel-titanium shape memory alloy.

15. The method of claim 11, wherein at least one of the first bias member or the second bias member comprises a steel alloy.

16. The method of claim 11, wherein the first direction is in a direction toward the seat.

17. The method of claim 11, wherein the first direction is in a direction away from the seat.

18. The method of claim 11, wherein the stopper is a sphere.

19. The method of claim 11, wherein at least one of the first bias member and the second bias member is a spring.

20. The method of claim 11, wherein the check valve is part of a mobile fluid transport platform that comprises a mobile fluid storage vessel, wherein providing the fluid to the fluid inlet at the first temperature further comprises providing the fluid from a mobile fluid storage vessel to the fluid inlet at the first temperature; and wherein providing the fluid to the fluid inlet at the second temperature further comprises providing the fluid from the mobile fluid storage vessel to the fluid inlet at the second temperature.

21. A system for conditionally flowing a fluid based a temperature of the fluid, the system comprising:
   a valve body having a bore having a longitudinal axis and a seat along the bore, a fluid inlet at a first longitudinal end of the bore, and a fluid outlet a second longitudinal end of the bore;
   a stopper selectively movable along the bore to contact the seat, the bore being occluded when the stopper is in contact with the seat;
   a first bias member on a first longitudinal side of the stopper within the bore, the first bias member providing a first bias force upon the stopper in a first longitudinal direction; and
   a second bias member on a second longitudinal side of the stopper within the bore, the second longitudinal side being opposite the first longitudinal side, the second bias member providing a thermally variable second bias force upon the stopper in a second longitudinal direction opposite the first longitudinal direction, the second bias member comprising a thermally sensitive shape memory material, the thermally variable bias force being less than the first bias force at temperatures below about −50° C. and equal to or greater than the first bias force at temperatures at or above about −50° C.

22. The system of claim 21, wherein the first bias member comprises a thermally sensitive shape memory material and the first bias force is a thermally variable bias force, the thermally variable bias force being less than the thermally variable second bias force at temperatures below a threshold temperature of about −50° C. and equal to or greater than the thermally variable second bias force at temperatures at or above the threshold temperature.

23. The system of claim 21, wherein the second bias member comprises a thermally sensitive shape memory material and the thermally variable second bias force being less than the first bias force at temperatures below a threshold temperature of about −50° C. and equal to or greater than the first bias force at temperatures at or above the threshold temperature.

24. The system of claim 21, wherein at least one of the first bias member or the second bias member comprise a nickel-titanium shape memory alloy.

25. The system of claim 21, wherein at least one of the first bias member or the second bias member comprises a steel alloy.

26. The system of claim 21, wherein the first direction is in a direction toward the seat.

27. The system of claim 21, wherein the first direction is in a direction away from the seat.

28. The system of claim 21, wherein the stopper is a sphere.

29. The system of claim 21, wherein at least one of the first bias member and the second bias member is a spring.

30. The system of claim 21, wherein at least one of the first bias force and the thermally variable second bias force is based on the temperature of the fluid.

31. The system of claim 21, further comprising a mobile fluid storage vessel configured to provide a fluid to the fluid inlet.

\* \* \* \* \*